United States Patent [19]
Lasar

[11] 3,901,483
[45] Aug. 26, 1975

[54] METHOD AND APPARATUS FOR MIXING MATERIALS, INCLUDING GROUND MEAT

[76] Inventor: William Lasar, 7322 Rio Honda, Downey, Calif. 90241

[22] Filed: July 13, 1973

[21] Appl. No.: 379,069

[52] U.S. Cl. .............................. 259/41; 259/DIG. 31
[51] Int. Cl.² .... B01F 7/04; B01F 7/08; B01F 15/02
[58] Field of Search .................... 259/6, 41, DIG. 31

[56] References Cited
UNITED STATES PATENTS

| | | | |
|---|---|---|---|
| 3,482,821 | 12/1969 | Blackwood | 259/41 X |
| 3,790,138 | 6/1972 | Neier | 259/41 |
| 3,797,807 | 3/1974 | Behrens | 259/41 |

Primary Examiner—Harvey C. Hornsby
Assistant Examiner—Alan Cantor
Attorney, Agent, or Firm—Fulwider Patton Rieben Lee & Utecht

[57] ABSTRACT

An apparatus which is intended to mix different constituents such as fat and lean ground meat, into a homogenous mixture of material. The constituents are fed into a housing defining a mixing chamber. A shaft, provided with radial arms, rotates in an upper region of the mixing chamber, to mix the material. A screw conveyor rotates in a lower region of the chamber with the flights of the screw conveyor arranged to move the material from the opposite ends of the chamber towards its center. A central outlet in the bottom of the housing is controlled by a slidable closure. During mixing, with the outlet closed, the material fed towards the center by conveyor is forced to move upwardly into the upper region so that there is a flow of material from the lower region to the upper region and back again during the mixing process. This avoids settling of the more flowable components of the material into the lower region of the mixing chamber because they are continuously carried back up into the body of the mix. After mixing, the outlet is opened and the blend is forced downwardly through the outlet by a rotating paddle mounted on the conveyor shaft thus preventing bridging.

2 Claims, 7 Drawing Figures

PATENTED AUG 26 1975

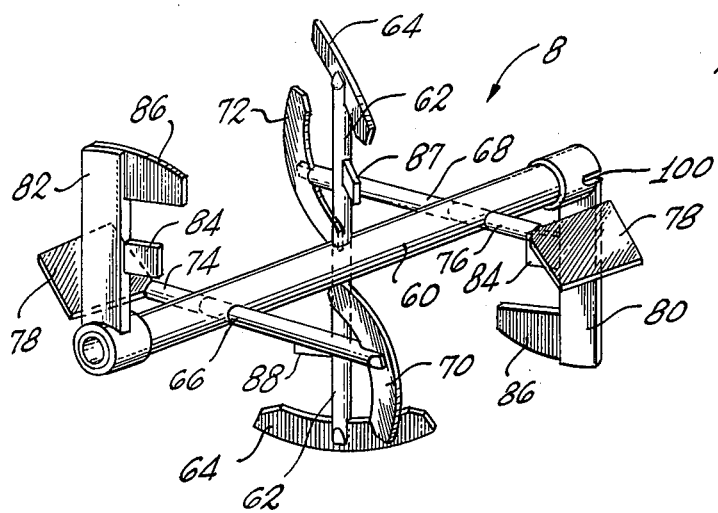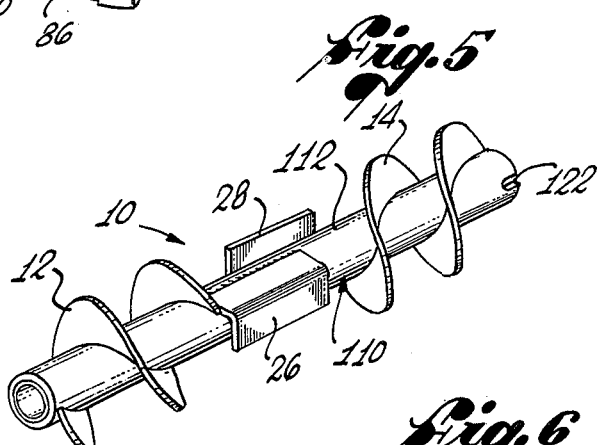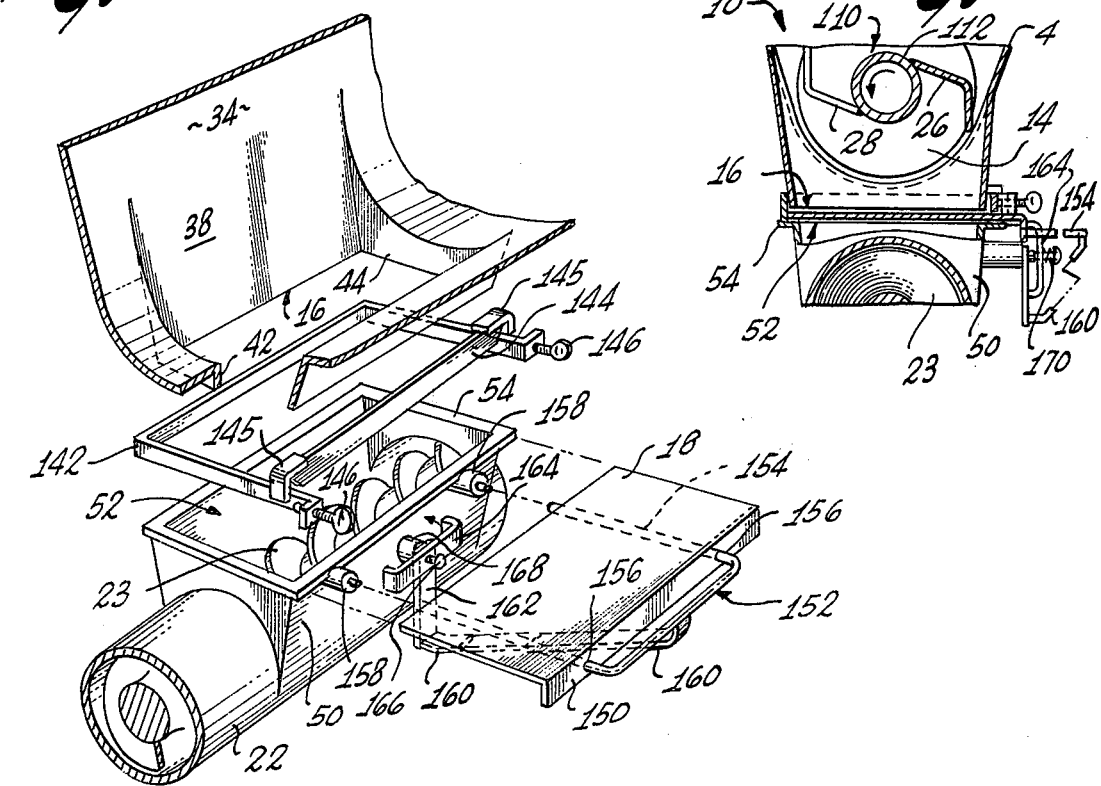

METHOD AND APPARATUS FOR MIXING MATERIALS, INCLUDING GROUND MEAT

BACKGROUND OF THE INVENTION

This invention relates to a method and apparatus for mixing materials, of the type utilizing a rotating stirrer extending through a mixing chamber. In particular, the invention relates to a device suitable for mixing foodstuffs, such as blends of fat and lean ground meat, to create a homogenous mix.

In mixing foodstuffs, such as in mixing fat and lean ground meat to obtain a hamburger mix of predetermined fat content, it is common to place the materials to be blended in a mixing chamber and subject them to the action of a rotating stirrer. A simple prior device for this purpose may, for example, comprise a housing defining a hopper-like mixing chamber with a horizontal, rotating shaft extending through the chamber. The shaft is provided with a number of radially extending arms which churn the materials for a sufficient length of time until a homogenous mix is achieved. To facilitate removal of the blend subsequent to mixing, a closable opening may be provided in the lower end of the hopper which can be opened after mixing has been completed so that the material can flow by gravity out of the mixing chamber. In a further refinement, the outlet opening may communicate with a second chamber in which is positioned an outlet screw conveyor for conveying the blended mix under pressure to force it through a grinding orifice for a subsequent step of subjecting the ground meat to further grinding.

Certain problems may, however, be encountered with a prior mixing system of the type described. One problem is that during the mixing process certain relatively more flowable components of the materials being mixed (e.g. liquid components in the mix) may tend to settle towards the bottom of the mixing chamber and accumulate there below the reach of the stirrer. As a result, an inconsistent mixture is provided which becomes progressively more moist from top to bottom of the mixing chamber. The problem is particularly troublesome in connection with the liquids that are present in ground meat, which tend to seep downwardly and accumulate.

Another problem may arise during emptying of the mixing chamber after mixing has been completed. When relying on a gravity feed through the outlet opening, the blended materials can sometimes tend to bridge over the outlet opening so that the blend ceases to flow. Another problem of like nature may be that the outlet screw conveyor sometimes tends to create a tunnel through the blended mix rather than conveying it in a steady stream. Bridging and tunnelling, if they occur even on a partial scale, create air pockets in the material in the flight of the outlet conveyor. Uneven flow of the blended material into the outlet screw conveyor can result in compacting the final mix in the outlet conveyor to different degrees leading to lumpiness and uneven consistency. The tendency of ground meat to agglomerate under pressure aggravates the problem.

SUMMARY OF THE INVENTION

The method and apparatus of the present invention are intended to effect mixing of materials, such as lean and fat ground meat, in such a manner that the more flowable components of the mixture are distributed equally through the final mix. Also, subsequent steps following the blending are intended to transport the final mix from the mixing zone without creating subsequent unevenness in its consistency or interruptions in the flow of mix.

More particularly, an apparatus according to the invention includes a housing defining a vertical mixing chamber which is adapted to receive the materials to be mixed. Extending longitudinally within an upper region of the mixing chamber is a mixer comprising a rotating shaft provided with a plurality of radial arms which exert longitudinal and peripheral, churning forces on the materials causing them to become mixed. Spaced below the mixer is a screw conveyor disposed in a lower region adjacent the bottom of the mixing chamber. The flights of the screw conveyor are so arranged that, as it rotates, material is moved from the opposite longitudinal ends of the mixing chamber towards its center. A central outlet opening in the bottom of the housing is closed during mixing so that the material being fed along the bottom of the mixing chamber towards the center has no path to escape and is forced to move upwardly into the upper region where it is subjected to the mixing action of the mixing rotor. Although the more flowable components of the materials being mixed, e.g. the liquids present in ground meat, have a tendency to seep downwardly to the bottom of the mixing chamber, the action of the conveyor continuously carries the liquids back up into the body of the mixture. As a result, the mix in the mixing chamber is of generally uniform moisture content from top to bottom.

After the mixing action has continued for a sufficient time to create a homogenous mix, the outlet opening is uncovered to permit the blended mix to exit. To prevent the mix from bridging over the outlet opening, the conveyor shaft is provided with two radially projecting paddles in its central region adjacent the outlet opening. As each paddle rotates downwardly, its lower side carries the material before it downwardly and forces it through the outlet opening. During the other, upward half of its motion, each paddle carries material from the lower to the upper region, thus assisting in the upward movement during the mixing phase previously described.

On the outer side of the outlet opening there is positioned a casing in which an outlet screw conveyor rotates. Because of the positive infeed to the outlet screw conveyor provided by each rotating paddle arm during its downward portion of the movement cycle, the flow into the second chamber is uninterrupted. In addition the positive infeed thus provided prevents the outlet conveyor from merely tunnelling beneath the mixing chamber. As a result developments such as lumps and agglomerations in the mix, or air pockets, are avoided.

For purposes of hygiene, it is necessary that the parts of the apparatus should facilitate rapid and easy disassembly for cleaning and sterilization. For this purpose, both the mixer and the conveyors are so mounted that they can readily be detached for washing and sterilization.

The closure assembly for the outlet opening is similarly designed for easy disassembly for cleaning. In particular, a generally U-shaped guide frame is provided which is detachably clamped around the edges of the outlet opening. The guide frame guides a horizontally slidable door which can move from a fully closed position totally obscuring the outlet opening to a fully open position in which the outlet opening is unobstructed. When the guide frame is unclamped and detached from the outlet opening, a sufficient gap is provided between the edges of the housing and adjacent portions of the casing to permit access by cleaning instruments such as cleaning brushes, steam sprays, and the like.

Although the invention is hereinafter described with reference to the mixing of foodstuffs, and in particular to the mixing of ground meat, it is to be understood that the mixing apparatus and method of the invention are not restricted to employment with the foregoing materials.

Other benefits and advantages of the mixing method and apparatus of the present invention, are described in the detailed description which follows hereafter.

BRIEF DESCRIPTION OF THE DRAWINGS

An apparatus for mixing materials is illustrated in the accompanying drawings in which:

FIG. 4 is a perspective view of a mixer forming a part of the apparatus shown in FIG. 2;

FIG. 5 is a perspective view of the conveyor shaft shown in FIG. 2;

FIG. 6 is a cross-sectional end view of a portion of the apparatus shown in FIG. 2; and FIG. 7 is an exploded perspective view, partially in cross-section, of an outlet opening and slidable closure therefor, forming a part of the apparatus shown in FIG. 2.

DETAILED DESCRIPTION

Figure 1:
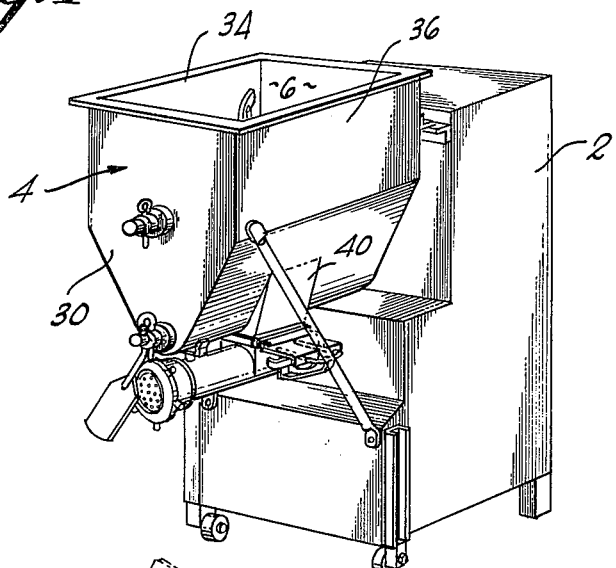
FIG. 1 is a perspective of an apparatus for mixing materials, constructed in accordance with the preferred embodiment of the invention.
Figure 2:
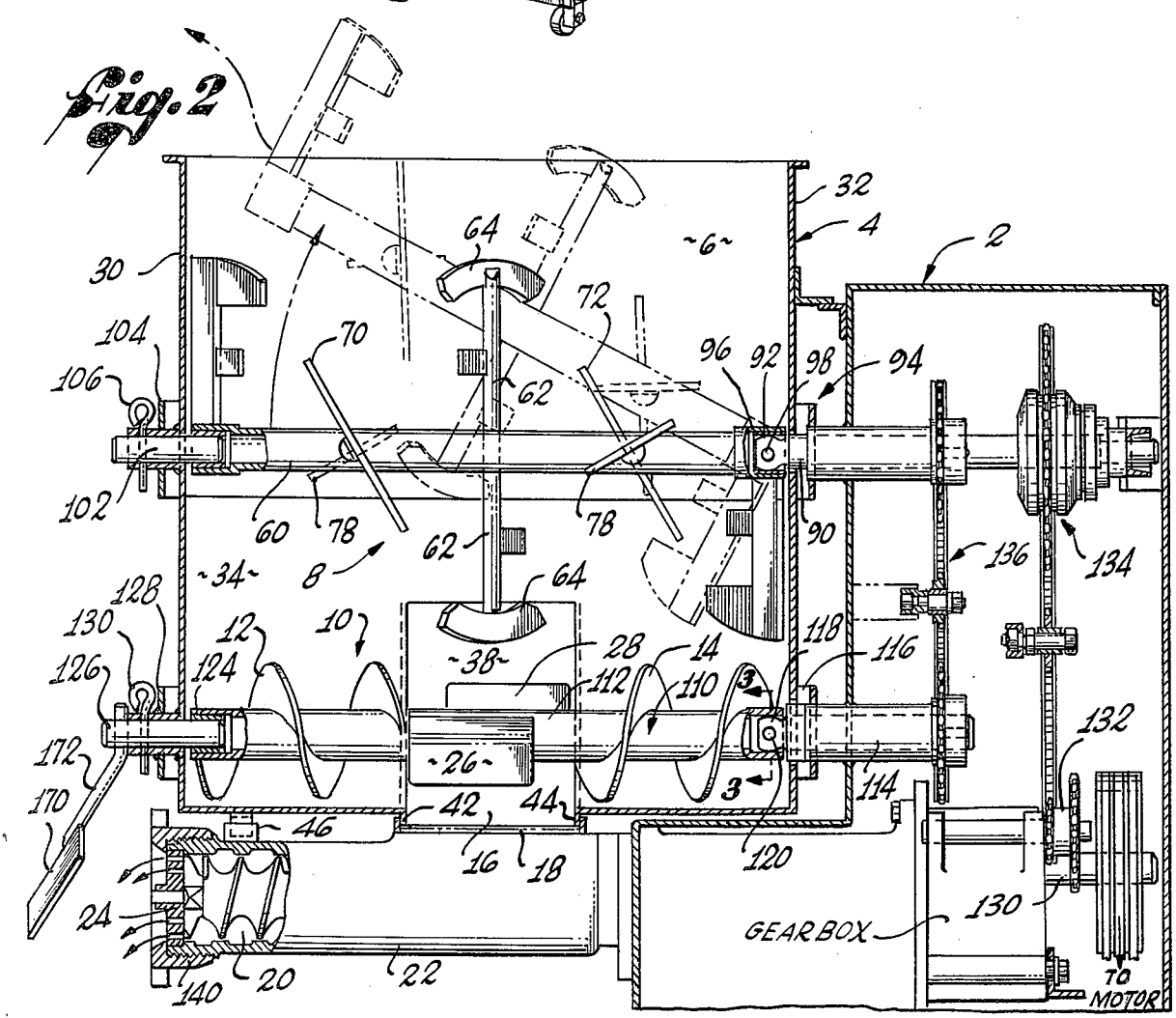
FIG. 2 is a cross-sectional side view of a portion of the apparatus shown in FIG. 1.

Referring to FIGS. 1 and 2 of the drawings, an apparatus for mixing materials, constructed in accordance with the preferred embodiment of the invention, is there shown. The apparatus may be used, for example, for mixing predetermined quantities of fat and lean ground meat to obtain a homogenous hamburger mixture of predetermined fat content. Alternatively, it may be used to mix entirely different foodstuffs or, if desired, non-food materials.

The apparatus includes a generally rectangular, box-like supporting structure 2 which supports a vertical, hopper-like housing 4 defining an internal mixing chamber 6. Extending horizontally in a longitudinal direction through an upper region of the mixing chamber 6 is a mixer 8 which rotates to mix the material and render it homogenous. Parallel to and beneath the mixer 8 is a rotating screw conveyor 10 positioned in a lower region adjacent the bottom of the mixing chamber. The screw conveyor 10 has screw flights 12 and 14 of opposite hand adjacent its ends and, as it rotates, feeds material from opposite longitudinal ends of the chamber inwardly toward the center of the chamber. An outlet opening 16 centrally positioned in the bottom of the housing 4 is closed by a sliding door 18 during mixing. When the outlet is closed, the material fed towards the center of the mixing chamber by the screw conveyor flights has nowhere to go but up and is forced into the upper region of the mixing chamber where it is subjected to the action of the mixer 8.

If there are relatively more flowable components in the material being mixed (for example, liquids such as blood, lymph fluid, water and the like present in ground meat) that would normally tend to seep to the bottom of the mixing chamber, the just described action of the screw conveyor 10 in carrying the material from the lower region of the mixing chamber back into the upper region insures that the more flowable components are evenly distributed through the final mix. Thus, instead of a resultant mixture which became progressively more moist towards the lower end of the mixing chamber, the final mix in the mixing chamber of the present apparatus is of uniform moisture content throughout the vertical extent of the mixing chamber.

After mixing has proceeded for a sufficient time to create a homogenous mix of the materials in the mixing chamber, the door 18 is slid away to open the outlet 16 so that material can move from the mixing chamber 6 into a cylindrical outlet chamber 20 defined by a casing 22 supported beneath the housing 4. An outlet screw conveyor 23 extending concentrically through the outlet chamber 20 receives the mix and forces it under pressure through a grinding plate 24 to subject the mix to a further grinding operation.

Relying on a gravity feed alone to move the mix from the mixing chamber to the outlet conveyor, as has been known in prior devices, is subject to the problem that the ground mix frequently tends to bridge over the outlet opening so that there is an interrupted or uneven feed into the outlet conveyor. As a result of sporadic over-feeding or under-feeding of the outlet conveyor, uneven density and texture can be developed in the product. To avoid such bridging, the screw conveyor 10 in its central portion is provided with two oppositely projecting radial, paddle arms 26 and 28 of generally L-shaped cross-section (FIG. 6). Each paddle arm, during the downward portion of its movement, exerts a stuffing action on the material forcing it under even pressure through the outlet opening, thereby insuring an uninterrupted and even feed to the outlet conveyor so that consistency of the final mix is maintained without variation.

It will be appreciated that, during the earlier mentioned mixing stage of the process when the outlet opening 16 is closed, each of the paddle arms 26 and 28 in its upward phase of movement assists in carrying the material moved to the center by the screw flights 12 and 14, upwardly into the upper region of the mixing chamber.

In more detail, the housing 4, which is connected to the supporting structure 2 by conventional struts and bracketing, includes vertically and transversely extending front and rear end walls 30 and 32, respectively (FIG. 2). Extending between the end walls are right and left sidewalls 34 and 36 (FIG. 1) which extend vertically and longitudinally in parallel relation adjacent the upper region of the mixing chamber and converge symmetrically inward towards each other adjacent the lower region of the mixing chamber. The sidewalls 34 and 36 join integrally to provide a curved bottom end of the mixing chamber extending snugly around the screw flights of the conveyor 10 (FIG. 6). The inward sloping configuration of the sidewalls and their close fit relative to the conveyor flights insures that the conveyor 10 acts effectively on all the material moving under gravity to the bottom of the mixing chamber so that it is carried back up into the upper region and distributed evenly through the mix. Adjacent the center of the housing, the sidewalls 34 and 36 are provided with outwardly-bent portions 38 (FIG. 7) and 40 (FIG. 1). The outwardly-bent portions 38 and 40 are joined by internal, transverse, vertical walls 42 and 44 (FIG. 7). The walls 38–44 extend below the housing 4 and their lower edges define the previously mentioned outlet opening 16 for the passage of mix outwardly of the mixing chamber.

The mix leaving the mixing chamber 6 enters the outlet chamber 20 in the casing 22. The casing is of generally cylindrical configuration and is secured at its rear end to the supporting structure 2 extending forwardly beneath the housing 4. A bracket 46 connects the forward end of the casing 22 with the housing 4. Adjacent its rear end, the casing 22 is provided with an upwardly flared generally rectangular funnel 50. The funnel 50 has a rectangular opening 52 which is coextensive with and spaced below the opening 16 defined by the edges of the walls 38–44. A horizontal, outwardly facing flange 54, forming part of the funnel 50, extends peripherally around the edge of the opening 52. The funnel 50 guides the material passing through the openings 16 and 52 into the flights of the outlet conveyor 23.

The previously mentioned mixer 8 (FIG. 4) includes a shaft 60 positioned along the longitudinal center line of the housing 4 in its upper region. Adjacent its midpoint, two oppositely extending radial arms 62 are secured, each of which at its outer extremity is provided an arcuate blade 64. The blades 64 are directed at opposite angular inclinations to each other and exert peripheral and longitudinal mixing actions on the material as the shaft 60 is rotated. Positioned intermediate the ends of the shaft 60 and the radial arms 62, are two further radial arms 66 and 68 projecting on opposite sides of the shaft at right angles to the arms 62. The arms 66 and 68 are provided with oppositely inclined arcuate blades 70 and 72, respectively, of generally similar configuration to the blades 64. The radial extent of the arms 62, 64 and 68, which are generally equal, is such as to position the blades in closely spaced relation above the conveyor 10 at the lowest extremity of their travel and closely adjacent the surface level of the mix in the upper extremity of their travel. Because of the opposite inclinations of the blades, the mix in the radially outer swept region acted on by the blades 64, 70 nd 72 is moved in alternating, opposite longitudinal directions as the blades rotate while at the same time being subjected to peripheral forces.

To act on the mix on its radially inner swept region, i.e. within the peripheral paths defined by the blades 64, 70 and 72, additional mixing blades are provided on the shaft 60, at a closer radial location to the shaft. Thus, extending in an opposite radial direction from each of the radial arms 66 and 68 are relatively shorter radial arms 74 and 76, each of which is provided with a diamond-shaped blade 78 at its outer extremity. The blades 78 exert a further mixing action on the material in the inner radial region surrounding the shaft 60. In addition, mounted on each end extremity of the shaft are two radially-extending, oppositely inclined blades 82, each of which has radially, inner and outer, extended portions 84 and 86. The blades 80 move the material in a direction longitudinally inwardly towards the center of the mixing chamber while mixing it. Additional mixing action in the radially inner swept region is provided by oppositely inclined, short blades 87 and 88 mounted on the radial arms 62 adjacent their midpoints.

The combined effect of all the blades just described is to effect a rapid and thorough mixing of the material in the upper region of the mixing chamber so that a homogenous mix is rapidly attained.

Support for the shaft 60 is provided by a driving axle 90 (FIG. 2) projecting into the mixing chamber 6 through a bearing 94 mounted in the rear end wall 32 of the housing. The axle 90 has a ball-shaped head 92 which is received within an internally sleeved hub 96 secured to the rear end of the shaft 60. A transverse pin 98 secured to the ball head 92 locates in two slots 100 (FIG. 4) in the shaft 60 to impart rotary driving motion to the shaft. At its opposite end, the shaft 60 is supported on an axially slidable pin 102 mounted in a bearing 104 secured to the forward end wall 30 of the housing. The pin 102 is secured to the bearing 104 by a cotter pin 106 which may be withdrawn so that the pin 102 can be slid outwardly.

To remove the mixer 8 for cleaning, it is only necessary to withdraw the cotter pin 106 securing the pin 102 to the bearing and slide the pin 102 outwardly after which the mixer may be lifted upwardly, as shown in dotted lines in FIG. 2, and removed.

The earlier described screw conveyor 10 (FIG. 5) includes a tubular shaft 110 extending along the longitudinal centerline of the mixing chamber 6 in spaced parallel relation below the shaft 60 of the mixer. Adjacent the opposite ends of the shaft 110 are the screw flights 12 and 14 which are of opposite hand and move the material in opposite longitudinal directions inwardly towards the center of the mixing chamber as the shaft rotates. The flights 12 and 14 terminate on opposite sides of a central portion 112 of the shaft, aligned generally with the opening 16 (FIG. 2). The paddles 26 and 28 are welded to the central portion 112 extending from it tangentially in opposite directions. Each of the paddles 26, at approximately its mid-point, is bent at an obtuse angle slightly greater than a right angle and extends rearwardly (in the direction of rotation) into touching contact with the curved lower surface of the bottom of the housing 4.

During the mixing action, when the opening 16 is closed, each arm as it rotates downwardly towards the bottom of the housing, extends into sliding contact with the lower end of the housing. Each arm thus picks up the material fed towards the center by the screw flights and then, as it starts to move upwardly, assists in moving the material into the upper region to be subjected to the mixing action of the mixer 8. If there should be any relatively more flowable components in the mixture, such as liquids in the case of ground meat, the sliding contact between the paddles and the lower end of the housing insures that the more flowable material is picked up and carried back upwardly into the body of the material and remixed.

Figure 3:
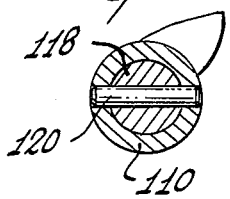
FIG. 3 is a cross-sectional end view of a portion of a conveyor shaft forming a part of the apparatus shown in FIG. 2, taken along the lines 3—3 therein.

The screw conveyor 10 is detachably supported in the housing 4 by an arrangement generally similar to that for the shaft 60 of the mixer 8. A drive shaft 114 (FIG. 2) supported by a bearing 116 mounted on the rear end wall 32 of the housing, includes a ball-shaped head 118 projecting inwardly of the mixing chamber. The ball head 118 is received within the open rear end of the shaft 110 and is drivingly coupled to it by a transverse pin 120 (FIG. 3) which engages corresponding slots 122 (FIG. 5) in the shaft. At its opposite end, the shaft 110 is provided with a sleeve 124 which receives a longitudinally slidable pin 126 supported by a bearing 128 on the front wall 30 of the housing 4. To remove the screw conveyor 10 for cleaning, a securing cotter pin 130, which connects the pin 126 to the bearing 128, is removed and the pin 126 is slid forwardly, after which the forward end of the screw conveyor is lifted upwardly and the conveyor then is lifted out of the mixing chamber.

The drive system for the apparatus (FIG. 2) includes a drive input shaft 130 driven by a motor. The input shaft 130 enters a conventional gear box. An output shaft from the gear box and a clutch (both not shown) enable driving torque to be applied to the outlet screw conveyor 23 to rotate it, at whatever different speeds may be selected, during the period that the material is being fed from the mixing chamber into the outlet chamber. The gear box includes another output shaft 132 connected by a drive train, designated generally as 134, to the previously mentioned drive axle 90 to rotate the mixer 8. A second drive train 136 connects the drive axle 90 to the mixer to the drive shaft 114 to the screw conveyor 10 so that both rotate in unison. It will be understood that the particular details of the drive system are conventional and may be varied as desired to drive the mixer and the conveyor together and to drive the outlet conveyor separately when required.

In the handling of ground meat and other perishable foodstuffs, it is important that the apparatus should facilitate easy disassembly for frequent cleaning. The manner in which the mixer 8 and screw assembly 10 can be detached has already been described. To remove the outlet conveyor 23, it is only necessary to unscrew a cap fitting 140 at the forward end of the casing 22 after which the grinding ring 24 and the screw conveyor 23 may be slid forwardly out of the outlet chamber 20. The remaining important area requiring disassembly prior to cleaning is the sliding door 18 for opening and closing the outlet opening 16.

Structure for this purpose (FIG. 7) includes a rectangular U-shaped guide frame 142 which extends around the exterior of the walls 42, 38 and 44 defining the outlet opening 16. A keeper bar 144 having L-shaped arms 145 resting slidably on the upper surface of the U-shaped arms of the guide frame 142 is slid into contact with the sidewall 40 and clamped against it by thumbscrews 146 to secure the guide frame. The guide frame encloses the vertical gap between the lower ends of the walls 38-44 and the rim 54 of the funnel 50 of the outlet chamber (FIG. 6) to prevent escape of material. The interior, transverse vertical surfaces of the guide frame 142 guide the door 18, which is a rectangular flat plate, for sliding motion on the rim 54 between a closed position (FIG. 6) and an open position (FIG. 7). It will be appreciated that the lower edge of the keeper 144 is spaced vertically above the rim 54 by a sufficient distance to allow for sliding passage of the door 18.

To provide support for the sliding door 18 in the open position, it includes a downwardly bent flange 150 along its outer longitudinal edge. An underlying, U-shaped supporting rod 152 includes transversely extending arms 154 which extend through openings 156 in the flange 150. The forward ends of the arms 154 are slidably received in bearings 158 mounted on the funnel 50. The end portion of the U-shaped member 152, extending between the arms 154, is supported by a downwardly-inclined transverse strut 160. The end of the strut 160 adjacent the funnal includes an upwardly-extending portion 162 connected to a U-shaped crosspiece 164. The crosspiece 164 is held in spring-loaded contact against the side of the funnel 50 by a headed pin 166 passing through the crosspiece into a fitting 168 on the side of the funnel. A spring 170 extends between the crosspiece 164 and the head of the pin.

In use, after the sliding door has been slid inwardly to the closed position, the support rod 152 is pulled laterally outwardly so that the ends of the arms 154 come out of bearings 158 and pass through the openings 156 in the flange on the door, such motion being permitted by the spring 170. The support rod 152 is then moved down slightly so that the ends of the arms 154 are no longer in registry with the openings 156 but instead abut the flange 150. The support rod is then released so that the spring 170, acting through the crosspiece 164 and the struts 160 and 162, causes the ends of the arms 154 to bear against the flange 150 and hold the sliding door in closed condition.

To open the door, the support rod 152 is moved upward a sufficient amount to move the pin arms 152 into registry with the openings 156 so that they pass through and enter the bearings 158. The sliding door may then be slid outwardly along the frame 152 to the open position.

To remove the guide frame and sliding door for cleaning, the thumb screws 146 are released, after which the keeper 144 and guide frame 142 may be removed. The U-shaped frame 152 is pulled away sufficiently to permit the pins 154 to move through the openings 156 in the door 18 so that it can be removed. After these steps have been performed, there is a sufficient vertical gap between the rim 54 and the lower edges of the walls 38-44 to permit ready insertion of cleaning instruments such as brushes, steam hoses and the like.

Further details of the apparatus may include a lid to extend over the open upper end of the housing if desired. In addition, a spurt plate 170 (FIG. 2) carried by an inclined arm 172 secured to the previously mentioned pin 126, is provided. The spurt plate 170 extends generally over and spaced from the outlet opening from the outlet chamber 20 to prevent the contents inadvertently striking the clothing of someone working on the machine and standing in front of it. The spurt plate may be moved out of the way or removed entirely whenever necessary.

Summarizing, the method and apparatus of the present invention enable mixing of materials to be conducted in such a manner that, if there are more flowable components which would otherwise tend to sink or settle to the bottom, they are continuously carried back up into the body of the material and remixed to ensure a homogenous blend. In this way, problems in the prior art involving the creation of a mix which became progressively more moist in a downward direction through the mixing chamber, are avoided. Another advantage of the present invention is provided by the paddle-like arms on three screw conveyor which ensure an even and uninterrupted feed of material from the final mix in the mixing chamber through to the outlet conveyor. The even feed thus provided avoids the creation of variations in density including such problems as lumping, agglomeration and air pockets in the final product.

The apparatus can readily be disassembled for cleaning as is very important in handling perishable food material such as ground meat. To remove the mixer and screw conveyor, it is only necessary to withdraw the pins in the forward endwall of the housing after which the mixer and conveyor can be lifted out. The outlet conveyor can be easily removed by unscrewing the cap on the forward end of the outlet chamber casing. To remove the sliding door, it is only necessary to unclamp the guide frame and detach it, together with the sliding door, after which a vertical gap between the adjacent edges of the mixing chamber and the outlet chamber is provided, which is sufficient for ease in cleaning.

Although the invention has been described with reference to certain preferred embodiments, it will be understood by those skilled in the art that many deletions, additions, substitutions, modifications, and other changes may be made which will fall within the spirit of the invention.

I claim:

1. An apparatus for mixing materials such as foodstuffs, the apparatus comprising:
   a housing defining a longitudinally and vertically extending mixing chamber, said chamber adapted to receive the materials to be mixed;
   mixing means connected with said housing for exerting a mixing action on the materials within said chamber;
   a casing connected to the lower end of said housing, said casing defining an outlet chamber positioned beneath said mixing chamber, said casing having,
   a casing inlet opening,
   a casing exit opening;
   a housing outlet opening at the lower end of said housing generally coextensive and aligned with said casing inlet opening for passage of material outwardly of said mixing chamber into said outlet chamber through said openings;
   conveyor means connected to said casing for moving material therein from said casing inlet opening to said casing exit opening;
   a generally rectangular U-shaped guide frame positioned between said housing and said casing extending about at least a portion of the periphery of said housing outlet opening;
   a door mounted in said guide frame for guided motion between a closed position in which said door closes said housing outlet opening and an open position in which said housing outlet opening is unobscured by said door, said guide frame and said door being entirely separable from said housing and said casing for cleaning, said guide frame having,
   two spaced opposed arms guiding said door for sliding motion therebetween;
   a cross member connecting said arms at one end thereof;
   a keeper member contacting the opposite ends of said arms extending therebetween; the apparatus further including:
   projecting portions on at least one of said housing and said casing, said projecting portions engaging said arms and said members on the interior surfaces thereof; and
   releasable securing means connecting said keeper member to said arms for securing said arms and said members to said projecting portions.

2. An apparatus as defined in claim 1, wherein said projecting portions are connected to said housing extending downwardly therefrom around said housing outlet opening and wherein said casing includes flat, upwardly facing, horizontal surfaces around said casing inlet opening to slidably support said door.

* * * * *